United States Patent [19]
Sato et al.

[11] Patent Number: 5,019,853
[45] Date of Patent: May 28, 1991

[54] EXPOSURE CONTROL APPARATUS FOR USE IN CAMERA

[75] Inventors: Toshihiro Sato, Tokyo; Tadao Takagi, Yokohama, both of Japan

[73] Assignee: Nikon Corporation, Tokyo, Japan

[21] Appl. No.: 573,267

[22] Filed: Aug. 27, 1990

Related U.S. Application Data

[63] Continuation of Ser. No. 421,329, Oct. 16, 1989, abandoned.

[30] Foreign Application Priority Data

Oct. 14, 1988 [JP] Japan .................................. 63-258928
Dec. 23, 1988 [JP] Japan .................................. 63-326918

[51] Int. Cl.$^5$ ............................................. G03B 7/00
[52] U.S. Cl. .................................. 354/420; 354/149.11
[58] Field of Search ........................... 354/420–423, 354/145.1, 148, 149.11

[56] References Cited

U.S. PATENT DOCUMENTS 4,159,168  6/1979  Sumi et al. ........................... 354/420
4,415,247  11/1983  Takematsu ........................... 354/149.11

Primary Examiner—L. T. Hix
Assistant Examiner—David M. Gray
Attorney, Agent, or Firm—Shapiro and Shapiro

[57] ABSTRACT

Disclosed is an exposure control device for an automatic illumination adjustment controlled type camera in which flashing of a flash apparatus built in a camera body is automatically stopped. The exposure control device includes an exposure value calculating unit for calculating an exposure value on the basis of photometering of an object before an exposure operation is started, and an exposure value compensating unit for correcting the exposure value calculated by the exposure value calculating unit to a value which assures overexposure when a picture is taken using a flash. Also disclosed is a TTL automatic illumination adjusting type camera which has an illumination adjusting unit for receiving light coming from a flash, reflected by an object and incident through a lens, and for stopping the flashing of the flash apparatus when the amount of light received reaches an illumination adjusting level. The camera is capable of employing a plurality of electronic flash apparatuses having different flashing characteristics. The camera includes a recognizing unit for outputting a recognition signal when it recognizes the type of the electronic flash apparatus used, and a level setting device for setting the illumination adjusting level on the basis of the recognition signal, such that an object having the same luminance is illuminated by the same amount of light regardless of which one of the electronic flash apparatuses is used.

22 Claims, 15 Drawing Sheets

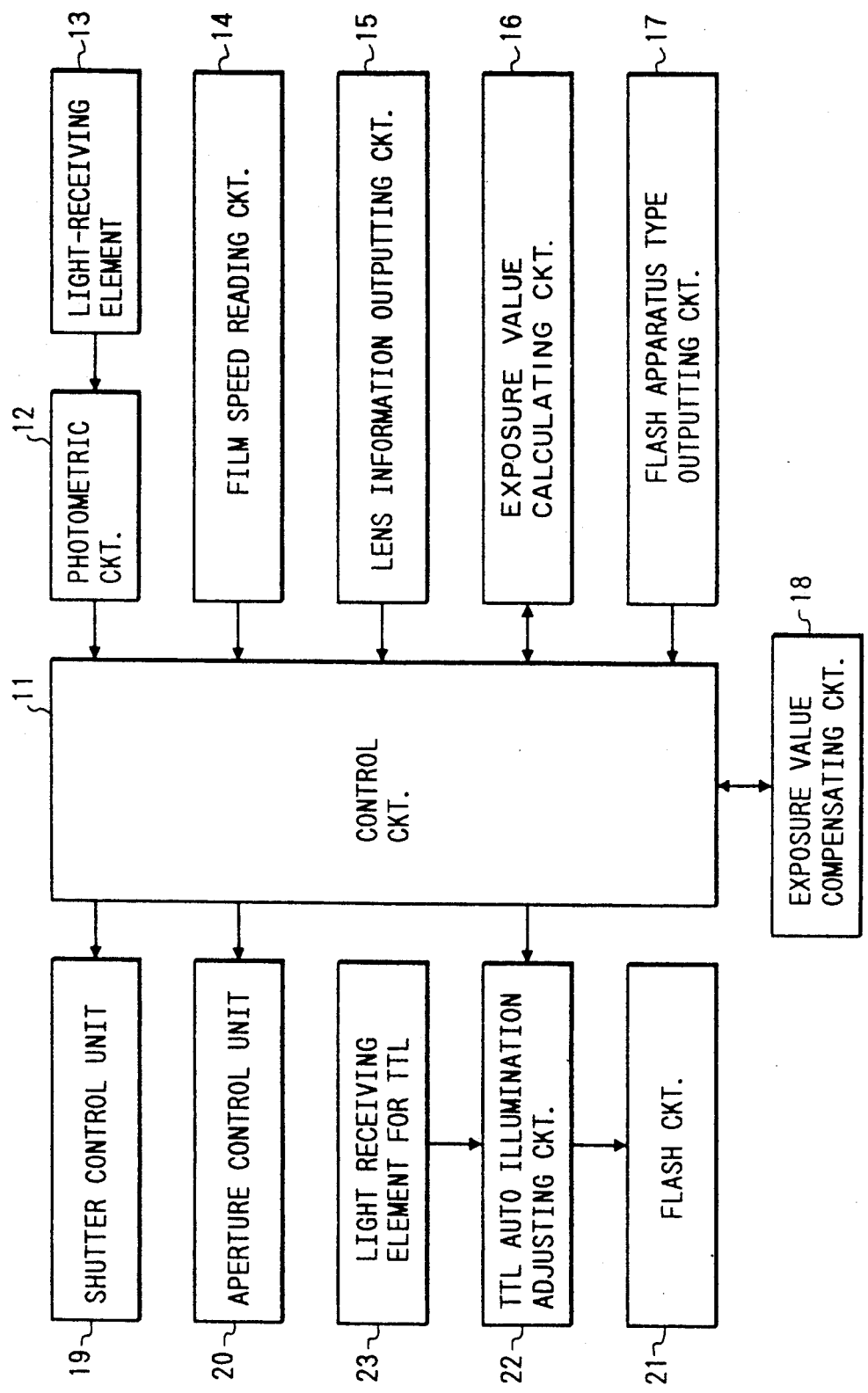

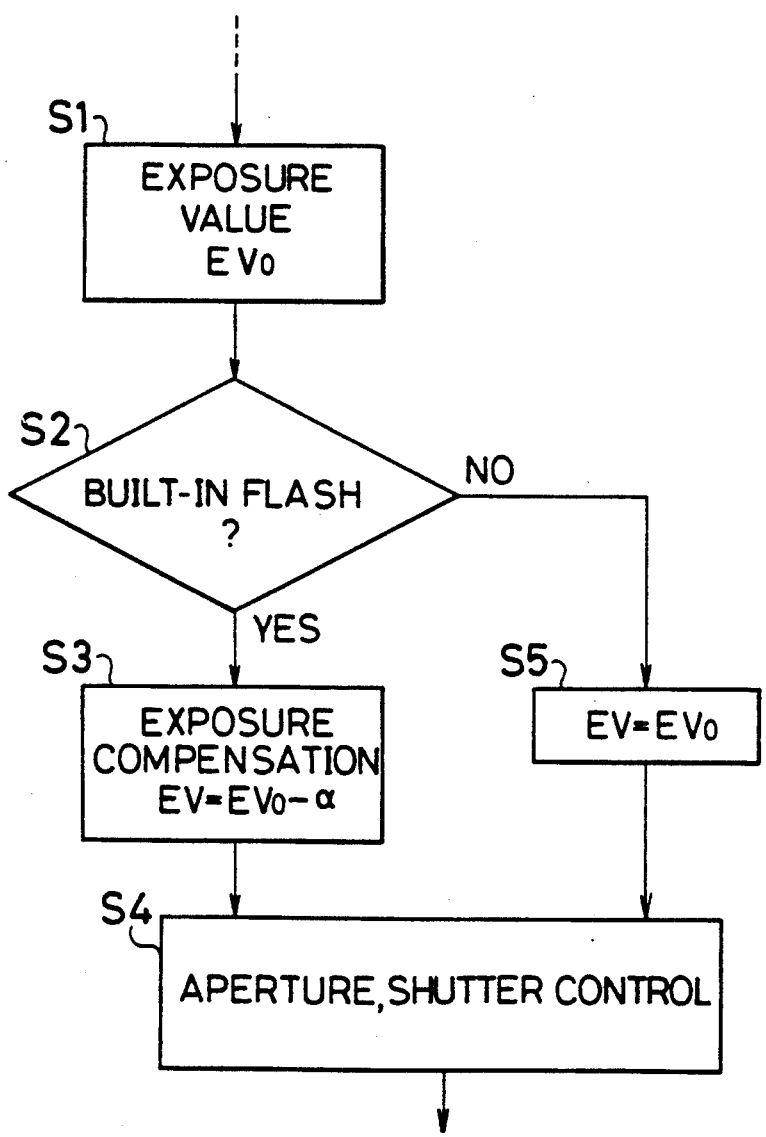

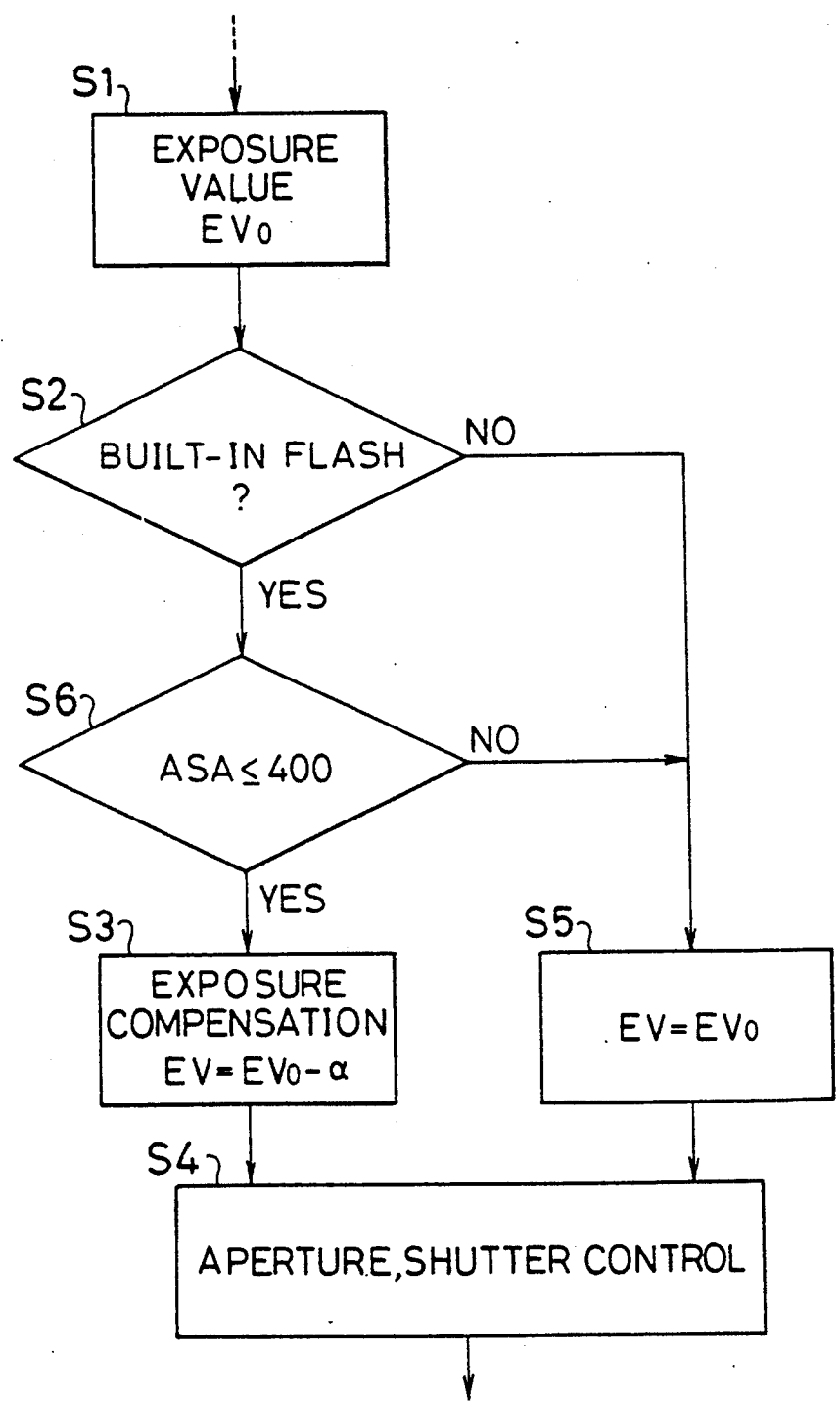

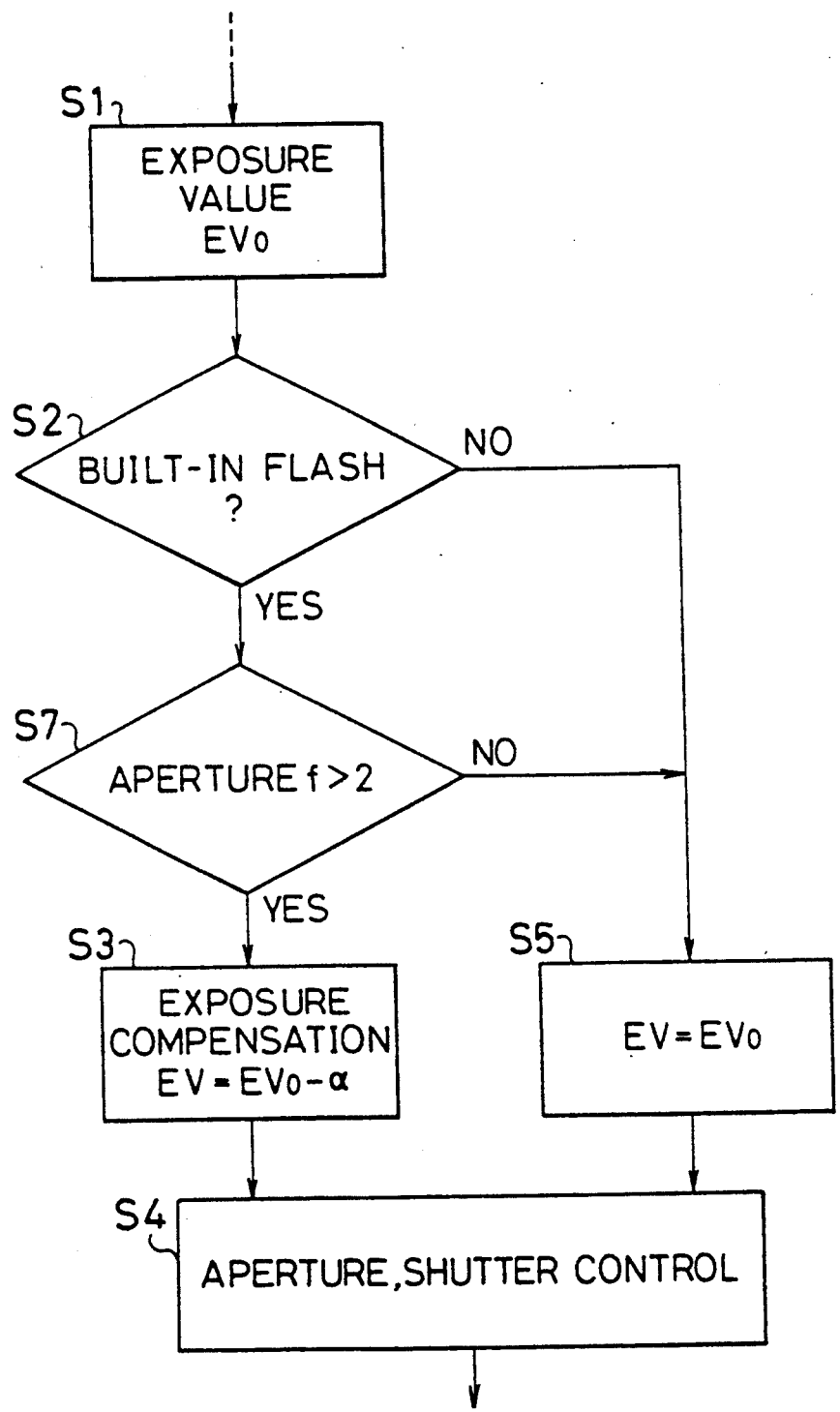

FIG.13

| FIG.13(a) |
| FIG.13(b) |

FIG.13(a)

- HALF PUSHING FOR START
- S11: PHOTOMETRY PROCESSING
- S12: TAKING FLASH PICTURE?
  - NO → S14: NORMALLY TAKING PICTURE PROCESSING → ①
  - YES → S13: DAYLIGHT SYNCHRONIZING?
    - NO → S16: ELECTRONIC FLASH?
      - COMMUNICATION TYPE → S19: R←R3
      - BUILT-IN TYPE → S17: R←R1
      - UNCOMMUNICATION TYPE → S18: R←R2
    - YES → S15: RR SETTING → S20: ELECTRONIC FLASH?
      - COMMUNICATION TYPE → S23: R←RR−ΔR3
      - BUILT-IN TYPE → S21: R←RR−ΔR1
      - UNCOMMUNICATION TYPE → S22: R←RR−ΔR2

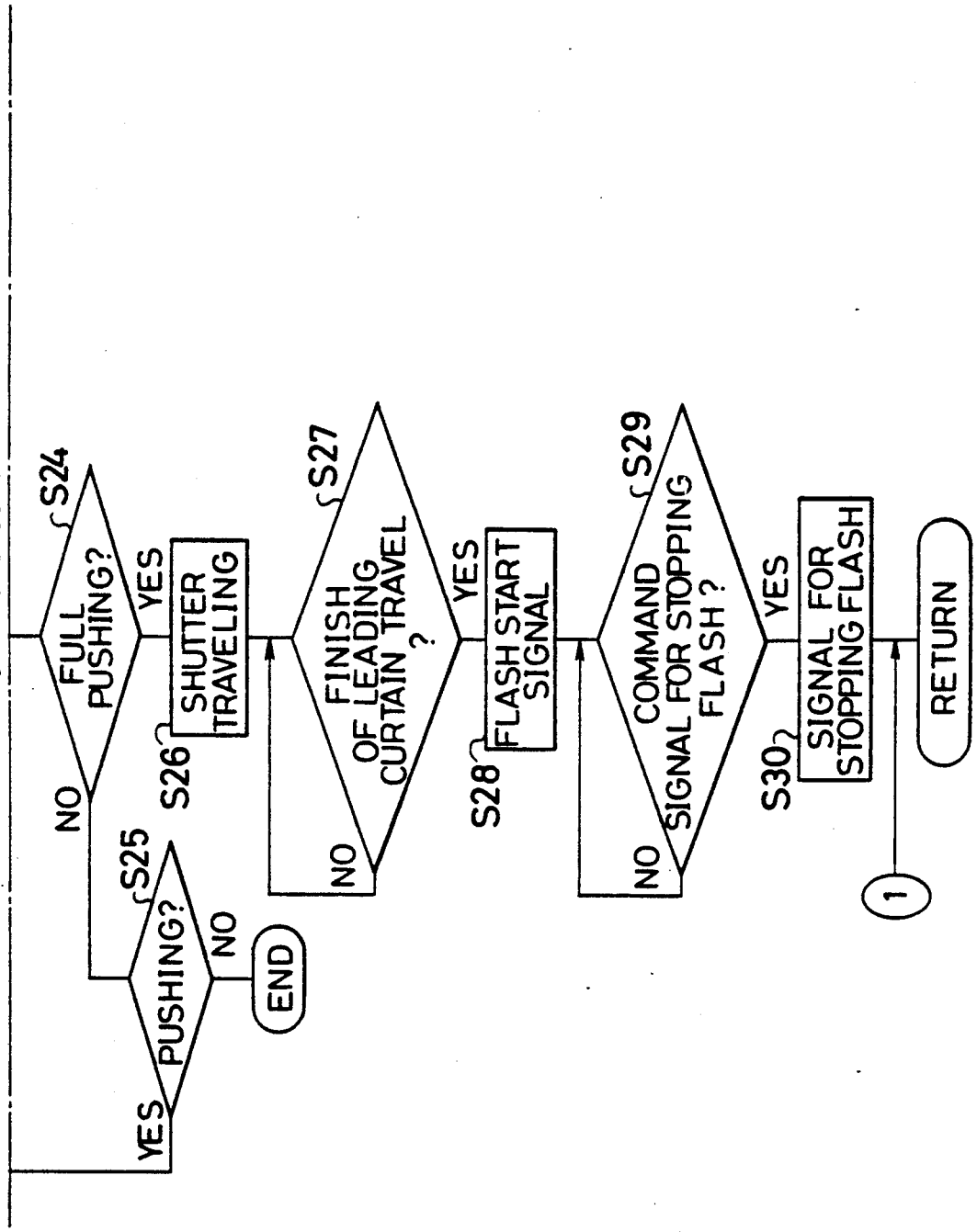

EXPOSURE CONTROL APPARATUS FOR USE IN CAMERA

This is a continuation of application Ser. No. 421,329 filed Oct. 16, 1989, now abandoned.

BACKGROUND OF THE INVENTION

1. Field of the Invention

The present invention relates to an exposure control apparatus for use in a camera with an electronic flash apparatus. The present invention is also concerned with a camera of the type in which flashing of the electronic flash apparatus is controlled by means of the TTL automatic illumination adjusting method, and more particularly, with a camera of the type in which an illumination adjusting level is adjusted in accordance with the type of the electronic flash apparatus used in the camera.

2. Related Background Art:

In the conventional exposure control apparatus of the above-described type, an exposure value is calculated on the basis of the output of a photometric means for measuring the luminance of an object before an exposure operation is started, and an exposure operation is then conducted with an aperture and a shutter speed which are determined in accordance with the calculated exposure value.

Furthermore, in the flashing mode in which a shutter speed is normally fixed, an aperture corresponding to the already determined fixed shutter speed is first determined in accordance with the exposure value calculated on the basis of the photometric output. Next, the amount of the light from an object is measured Flashing is automatically stopped when the measured value reaches a predetermined level. In consequence, a correct exposure can be obtained for a background as well as for a person who is within the effective distance of the flash apparatus, which distance is determined by a guide number thereof.

Next, a TTL automatic illumination adjusting device for performing an automatic illumination adjustment control will be described with reference to FIG. 1 which shows a camera with the TTL automatic illumination adjusting unit. A camera body 1 incorporates a lens 2. An attachable electronic flash apparatus 3 is attached to the camera body 1. The camera body 1 shown is in an operating state. In this state, a main mirror 4 is raised, and a light coming from the electronic flash apparatus 3 and reflected by an object is passed through the taking lens 2. This light is reflected by a film surface 5, and is incident on a light-receiving element 7 through a light gathering lens 6. The light received by the light-receiving element 7 is converted to an electric signal, and this electric signal is integrated by time to obtain an integration value. An illumination adjusting circuit (not shown) outputs a flash stopping signal to stop flashing of the electronic flash apparatus 3 when this integration value reaches a level which is predetermined by the illumination adjusting circuit. A reference numeral 8 denotes a pentagonal prism, 9 denotes an aperture, and 10 denotes a shutter.

The flash apparatus for a camera is classified into two types: an attachable flash apparatus which can be attached to the camera body and a built-in type flash apparatus which is built in the camera body.

Generally, the attachable flash apparatus has a guide number of 20 or above, i.e., a long effective distance, and emits a large amount of light. The built-in type flash apparatus is generally designed to have a guide number of 15 or less, i.e., a short effective distance, and to emit a small amount of light because of the restricted space in the camera body where it is accommodated.

However, with a conventional exposure control unit, the same operation is performed to obtain an exposure value regardless of whether the type of flash apparatus is the attachable flash apparatus having a large guide number or the built-in type flash apparatus having a small guide number. In consequence, when an object located at a long distance is illuminated by the built-in flash apparatus having a small guide number, the amount of light emitted from the flash apparatus is small, and an underexposure is therefore obtained for the overall picture.

In particular, when a picture of a person who is beyond the effective distance of the flash apparatus is taken using the built-in flash apparatus under a dim available light, such as at dusk, the amount of light illuminating the person is small, and an underexposure is therefore obtained for the person. The background is illuminated by the light emitted from the flash apparatus as well as the available light, and a correct exposure is therefore obtained. This results in underexposure for the overall picture.

When a picture of a person who is in the shade is taken in the daytime using the built-in flash apparatus, and the distance between the person and the camera is long, underexposure of the person is likely to occur.

Furthermore, although the above-described conventional camera of the TTL automatic illumination adjusting type can employ a plurality of electronic flash apparatuses which generate different flashing waveforms or have different illumination stopping capabilities (the capabilities determined by the time required to actually stop the flashing after the flashing stopping signal has been sent out), the above-described illumination adjusting level is fixed. In consequence, the amount of light illuminating an object of given luminance may differ depending on the electronic flash apparatus used; a correct exposure may be obtained when a certain type of electronic flash apparatus is used, while underexposure or overexposure may be obtained when another type of electronic flash apparatus is used. In this specification, the flashing waveform or the flashing stopping capability is hereinafter referred to as the flashing characteristics.

The flashing characteristics will be described below in detail with reference to FIGS. 2 to 4.

FIG. 2 shows how the amount of light illuminating an object differs depending on the time required for a flash apparatus to actually stop flashing after a flashing stopping signal has been sent to the electronic flash apparatus. The ordinate axis represents an intensity of light I, and the abscissa axis represents a time t.

In the graph shown in FIG. 2, t0 is the time at which flashing is started, t1 is the time at which the flashing stopping signal is sent out, t2 and t3 are the times at which flashing of the flash apparatus is actually stopped. Since the amount of light illuminating the object is an integration value, if the period of time from time t1 to time t2 and the period of time from time 1 to time 3 differ from each other, the amount of light illuminating the object differs by the value indicated by the hatched area.

FIG. 3 is a graph, showing how the amount of light illuminating the object differs depending on the flashing waveforms.

Even though flashes with waveforms A and B stop at the same time t2' after the flashing stopping signal has been sent out at time t1', the amount of light illuminating the object differs by the value indicated by the hatched area.

In practice, the amount of light illuminating the object differs depending on the factors shown in FIGS. 2 and 3.

In a case where a picture is taken by the daylight synchronized flash, an object is illuminated by a smaller amount of light to enable a natural picture to be obtained. This makes the above-described problem more serious. For example, in the case shown in FIG. 4 which employs the same flashing waveform as that employed in the case shown in FIG. 2, the amount of light illuminating the object when the picture is taken by the daylight synchronized flash is reduced by sending out a flash stopping signal at time t1" which is earlier than time t1 in the case shown in FIG. 2. If it is assumed that t2"−t1"=t2−t1 and that t3"−t1"=t3−t1, the differences in the amounts of light irradiating the object in FIGS. 4 and 2 are respectively equal to the differences in the integration values between t3"−t2" and t3−t2. In consequence, the difference in the amount of light which occurs when the picture is taken by the daylight synchronized flash, as shown in FIG. 4, is greater because the flashing is stopped when the object is illuminated by a larger amount of light. That is, the hatched area is greater than that shown in FIG. 2.

SUMMARY OF THE INVENTION

Accordingly, an object of the present invention is to provide an exposure control apparatus for a camera which ensures a correct exposure for an object which is beyond the effective distance of a flash apparatus.

Another object of the present invention is to provide a TTL automatic illumination adjusting type camera which enables an object of given luminance to be illuminated by the same amount of light when a picture thereof is taken using various types of electronic flash apparatus having different flashing characteristics.

In order to achieve the aforementioned objects, the present invention provides a camera with an automatic illumination adjusting function in which flashing of a flash apparatus built in a camera body is stopped when the amount of the light from an object reaches a predetermined level. The exposure control apparatus includes an exposure value calculating means for calculating an exposure value on the basis of a photometric output of an object before an exposure operation is started, and an exposure value compensating means for correcting the exposure value calculated by the exposure value calculating means to a value which assures overexposure when a picture is taken using the built-in flash apparatus.

No exposure compensation is performed when the exposure value calculated by the calculating means is less than a predetermined value, when a film speed is higher than a predetermined value, when an aperture is less than a predetermined value which is sufficiently low, and/or when an object distance is within the effective distance determined by the guide number of the built-in flash apparatus.

The present invention also provides a TTL automatic illumination adjusting type camera which is shown in FIG. 5. The camera has an illumination adjusting means 103 for receiving a light coming from a flash apparatus 101, reflected by an object and incident through a lens 102, and for stopping the flashing of the flash apparatus 101 when the amount of light received reaches an illumination adjusting level. The camera is capable of employing a plurality of electronic flash apparatuses having different flashing characteristics. The camera includes a recognizing means 104 for outputting a recognition signal when it recognizes the type of the electronic flash apparatus used, and a level setting means 105 for setting the illumination adjusting level such that an object of given luminance is illuminated by the same amount of light regardless of the electronic flash apparatus are used, on the basis of the recognition signal.

In the exposure control apparatus according to the present invention, when a picture is taken using the built-in flash apparatus, an exposure is performed using an exposure value which is corrected from that obtained by the photometric result of an object before the exposure operation is started and which assures overexposure.

If it is assumed that the shutter speed is fixed to 1/125 sec and that the exposure value EV0 calculated on the basis of the photometric output is 15, the aperture is conventionally set to, for example, 16 which satisfies the exposure value EV0=15. However, in the present invention, the exposure value EV0 of 15 is corrected to, for example, the exposure value EV of 13 by reducing a predetermined value $\alpha$ which may be 2 from EV0, resulting in the change of the aperture from 16 to 8.

In consequence, even when the amount of light from reflected by the object is small, the entirety of the object can be illuminated by the flash apparatus as well as by the available light, ensuring a correct exposure for the main object which may be a person and overexposure for the background. This can eliminate conventional picture failures which are caused by underexposure.

Furthermore, in the TTL automatic illumination adjusting type camera according to the present invention, the recognizing means 104 recognizes the type of electronic flash apparatus employed, and the level setting means 105 sets the illumination adjusting level to a predetermined value which is determined in accordance with the electronic flash apparatus recognized. In consequence, an object of given luminance can be illuminated by the same amount of light regardless of the electronic flash apparatus used.

BRIEF DESCRIPTION OF THE DRAWINGS

Other features and advantages of the invention will become apparent from a reading of the following description of the preferred embodiments, taken in conjunction with the accompanying drawings, in which:

FIG. 6 is a block diagram of a first embodiment of the present invention;

FIGS. 7A, 7B, 7C and 7D are flowcharts of the exposure control operation conducted in the embodiment shown in FIG. 6;

FIGS. 9 to 11 are flowcharts of the exposure control operations conducted in another embodiments of the present invention;

FIG. 13, consisting of FIGS. 13(a) and 13(b) is a flowchart of an illumination adjusting level adjusting procedure.

It is to be noted that the same reference numerals are used to denote the corresponding parts or elements throughout the drawings.

DETAILED DESCRIPTION OF PREFERRED EMBODIMENTS

Figure 1:
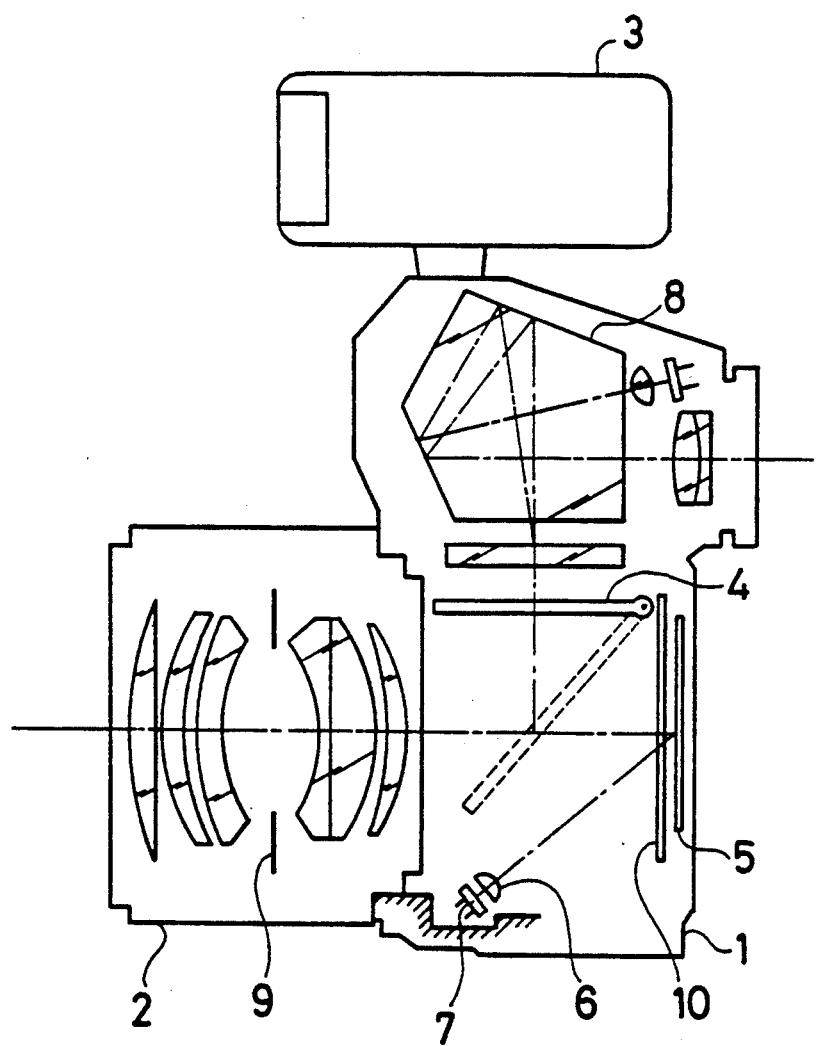
FIG. 1 is a view of a camera with a TTL automatic illumination adjusting type electronic flash apparatus.
Figure 2:
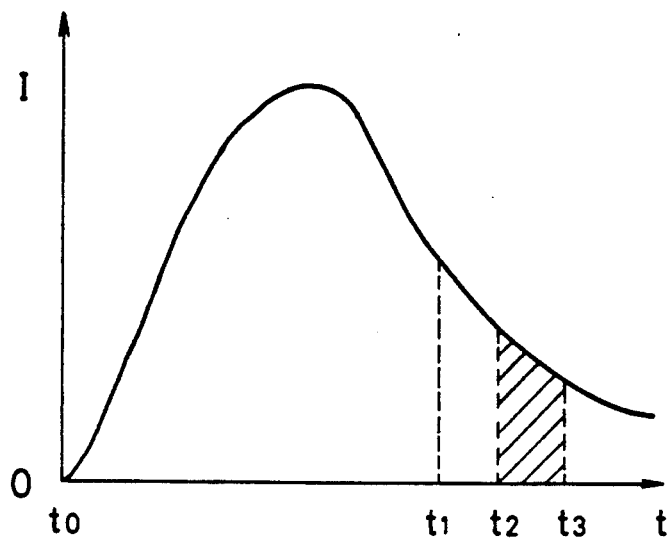
FIGS. 2 to 4 are graphs of various types of flashing waveforms.
Figure 3:
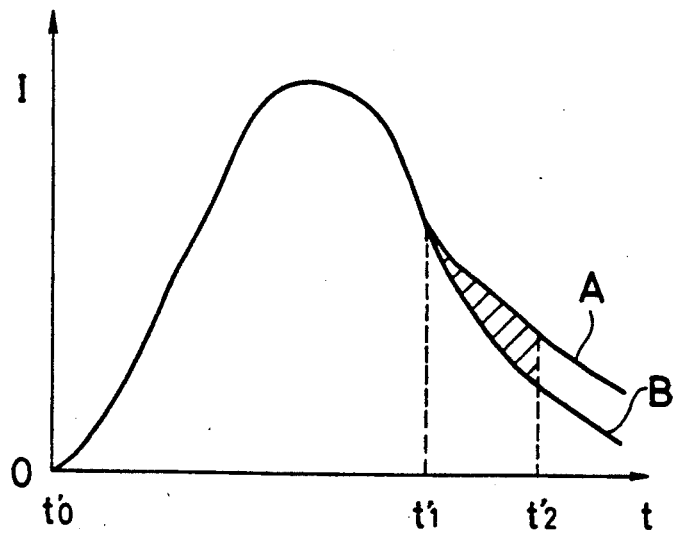
Figure 4:
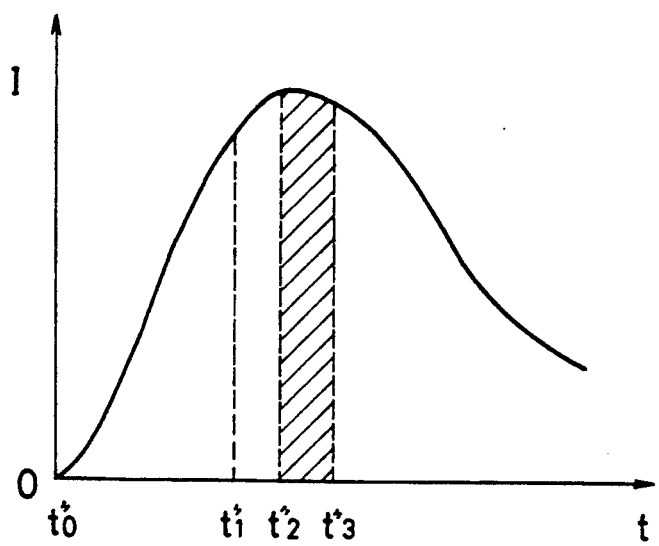
Figure 5:
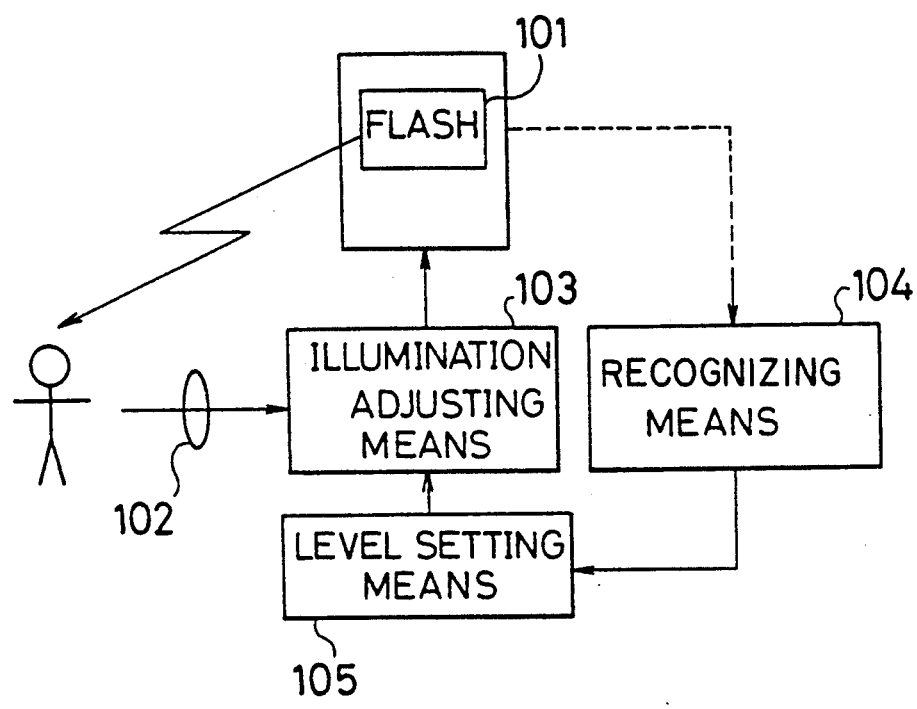
FIG. 5 is a block diagram of relevant portions of a TTL automatic illumination adjusting camera in accordance with the present invention.

A first embodiment of the present invention will be described below with reference to FIG. 6.

In the structure shown in FIG. 6, a control circuit 11 which may be a central processing unit controls various circuits and components which are associated with exposure operation. To the control circuit 11 are connected a metering circuit 12, a film speed reading circuit 14, a lens information outputting circuit 15, an exposure value calculating circuit 16, a flash type outputting circuit 17, an exposure value compensating circuit 18, a shutter control unit 19, an aperture control unit 20, and a TTL automatic illuminating adjusting circuit 22.

The metering circuit 12 outputs photometric information on the basis of the output of a light-receiving element 13 which receives the light reflected by an object. The film speed reading circuit 14 reads in the DX code provided on a film patrone and outputs the film speed information. The lens information output circuit 15 outputs lens information on a lens mounted on the camera, such as the full F stop value and the focal distance thereof. The exposure value calculating circuit 16 calculates an exposure value using the photometric information and the lens information which are respectively input from the metering circuit 12 and the lens information output circuit 15 through the control circuit 11, and outputs the resultant exposure value The flash apparatus type outputting circuit 17 determines whether or not a picture is taken in the flash mode in which a built-in flash apparatus is used, and outputs the resultant determination. The camera may be set to the flash mode in which a picture is taken using the built-in flash apparatus by an operator's manual popping up of the built-in flash apparatus. Alternatively, the camera may be automatically set to the automatic flash mode when the luminance of an object is a predetermined value or less.

The exposure value compensating circuit 18 corrects the exposure value calculated by the exposure value calculating circuit 16 to an exposure value which ensures an overexposure when the flash apparatus type outputting circuit 17 determines that the operation of the camera is in the flash mode, and outputs the corrected exposure value. When the flash apparatus type outputting circuit 17 determines that a picture is taken without using the built-in flash apparatus, the exposure value compensating circuit 18 is not operated and the exposure value calculated by the exposure value calculating circuit 16 is therefore used with no change.

The shutter control unit 19 and the aperture control unit 20 respectively control the shutter speed and the aperture on the basis of the exposure value calculated by the exposure value calculating circuit 16, when it is determined by the flash apparatus type outputting circuit 17 that a picture is taken in the non-flash mode. Alternatively, the control unit 19 and the aperture control unit 20 respectively control the shutter speed and the aperture on the basis of the corrected exposure value determined by the exposure value compensating circuit 18, when it is determined by the flash apparatus type outputting circuit 17 that a picture is taken in the flash mode.

The TTL automatic illumination adjusting circuit 22 is connected to a flashing circuit 21 for controlling the flashing of the built-in flash apparatus. Also, a TTL light-receiving element 23 for receiving the light coming through the lens from the object is connected to the TTL automatic illumination adjusting circuit 22.

More specifically, the flashing circuit 21 starts flashing the built-in flash apparatus when an X-contact (not shown) is closed in response to a release signal. The TTL automatic illumination adjusting circuit 22 calculates an amount of light incident on the TTL light-receiving element 23 through the lens, and outputs a flash stopping signal to stop flashing of the built-in flash apparatus when the amount of light reflected by the object reaches a predetermined level.

Figure 7B:
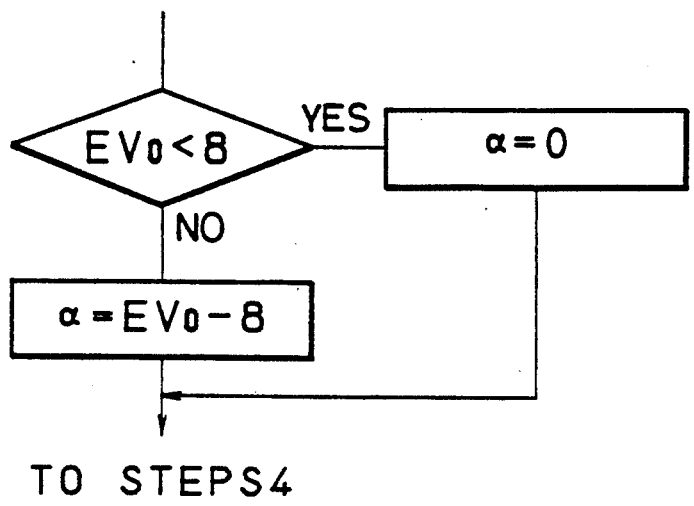

Next, the exposure operation carried out in the embodiment shown in FIG. 6 will be described below in detail with reference to the flowchart shown in FIG. 7A.

When a person who takes a picture presses a shutter release button (not shown) halfway, a halfway switch (not shown) is turned on, turning on the components shown in FIG. 6 including the control circuit 11. First, the photometric circuit 12 is calculated to output to the control circuit 11 the photometric information on the basis of the output of the light-receiving element 13 which receives the light reflected ty the object. Concurrently with this, the film speed information and the lens information are output to the control circuit 11 by the film speed reading circuit 14 and the lens information outputting circuit 15. Upon receipt of these types of information, the control circuit 11 outputs the photometric information, the film speed information and the lens information to the exposure value calculating circuit 16 which calculates an exposure value EVO in the processing of step S1 in FIG. 7A.

Subsequently, it is determined in step S2 whether or not a picture is taken using the built-in flash apparatus.

If the operator has set the camera to the flash mode in which a picture is taken using the built-in flash apparatus by popping up the flash or by the manual setting operation, it is determined in step S2 that the picture is taken using the built-in flash apparatus, and the processing proceeds to step S3 where the exposure value EVO calculated in step S1 is compensated.

More specifically, in this embodiment, the exposure value compensating circuit 18 calculates a correct exposure value EV by means of the following $$EV = EVO - \alpha$$

As a result, the exposure value EVO calculated in step S1 and the corrected exposure value EV calculated in step S3 have a relation of EV<EVO, and the exposure value EVO is therefore corrected to the exposure value EV which ensures an overexposure.

Thereafter, in step S4, the shutter speed and the aperture are respectively set in the shutter control unit 19 and the aperture control unit 20 on the basis of the corrected exposure value EV calculated in step S3, and an exposure accompanied by the flashing of the built-in flash in then performed when the release switch is turned on by the full-pressing of the release button.

If it is determined in step S2 that the picture is taken without using the built-in flash apparatus, the processing goes to step S5 where the corrected exposure value EV is replaced by the exposure value EVO, i.e., where no exposure compensation is conducted. Thereafter, in step S4, the shutter speed and the aperture are controlled and exposure is conducted by the release signal which is output by the full pressing of the release button.

Figure 8A:
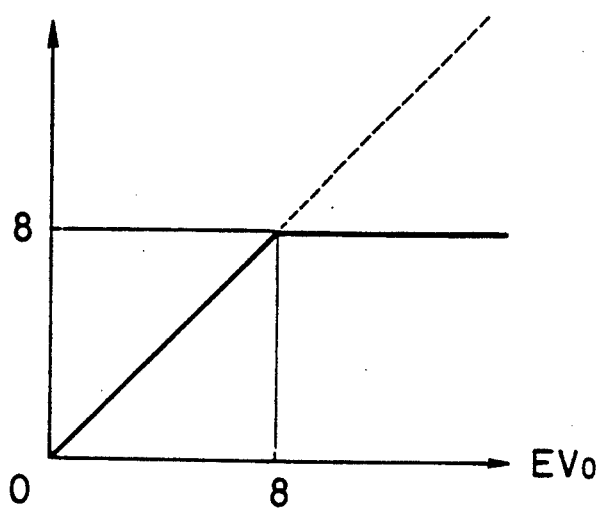
FIGS. 8A to 8C are graphs, illustrating the exposure compensations conducted in the present invention.
Figure 8B:
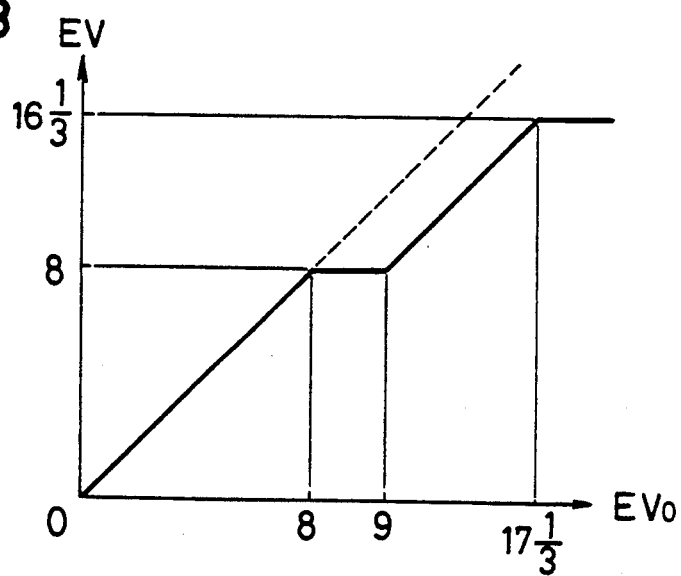
Figure 8C:
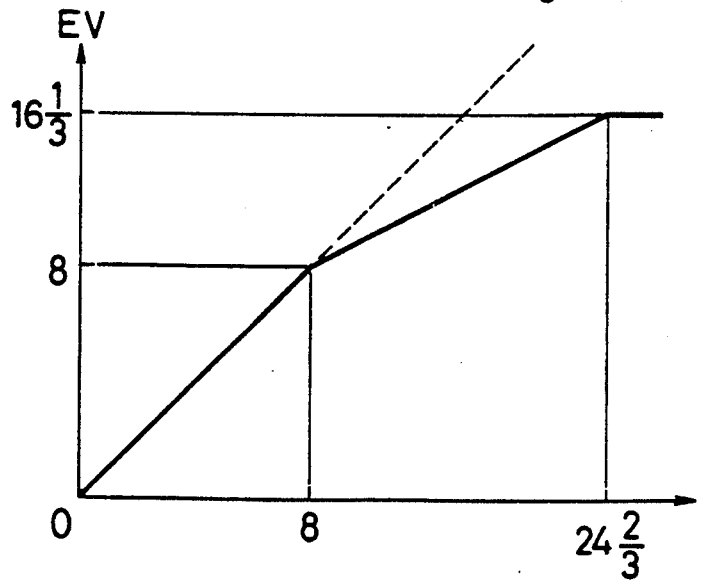

FIGS. 8A to 8C are graphs of three exposure value compensation characteristics, showing examples of the exposure value compensation processing executed in step S3 in FIG. 7A.

In the graphs shown in FIGS. 8A to 8C, the abscissa axis represents the calculated exposure value EVO, and the ordinate axis represents the corrected exposure value EV. In each of the cases shown in FIGS. 8A to 8C, exposure value compensation operation having the corresponding characteristics is performed when a picture is taken using the built-in flash apparatus in the range of a calculated exposure value EVO of 8 or above, i.e., under light brighter than at dusk.

In the case shown in FIG. 8A, when a picture is taken without using the built-in flash, the calculated exposure value EVO is used as the corrected exposure value EV with no change, as shown by the broken line in FIG. 8A. When a picture is taken using the built-in flash apparatus and the calculated exposure value EVO is 8 or above, the corrected exposure value EV which determines the actual shutter speed and the aperture is fixed to 8. The exposure compensation operation shown in FIG. 8A corresponds to the flowchart of FIG. 7B.

Figure 7C:
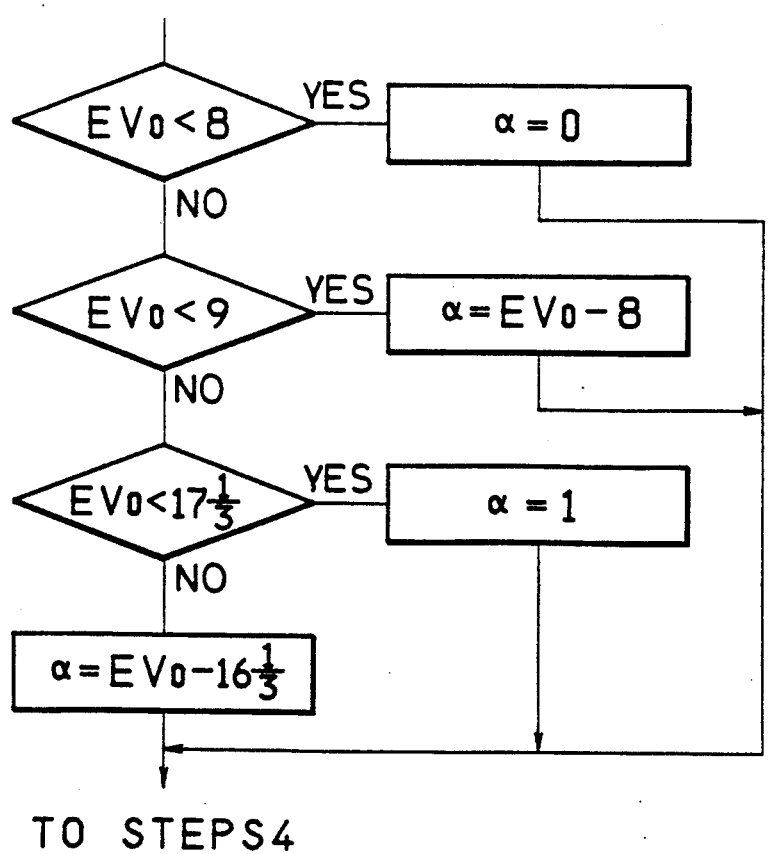

FIG. 8B shows the exposure value compensation in which the calculated exposure value EVO which is 8 or above is corrected to the corrected exposure value EV as follows:

$$EV = EVO - \alpha$$

where $\alpha = EVO - 8$ for calculated exposure values $8 < EVO < 9$, $\alpha - 1$ for calculated exposure values $9 < EVO < 17\frac{1}{3}$, and $\alpha = EVO - 16\frac{1}{3}$ for calculated exposure values $17\frac{1}{3} < EVO$. The exposure compensation operation shown in FIG. 8B corresponds to the flowchart of FIG. 7C.

Figure 7D:
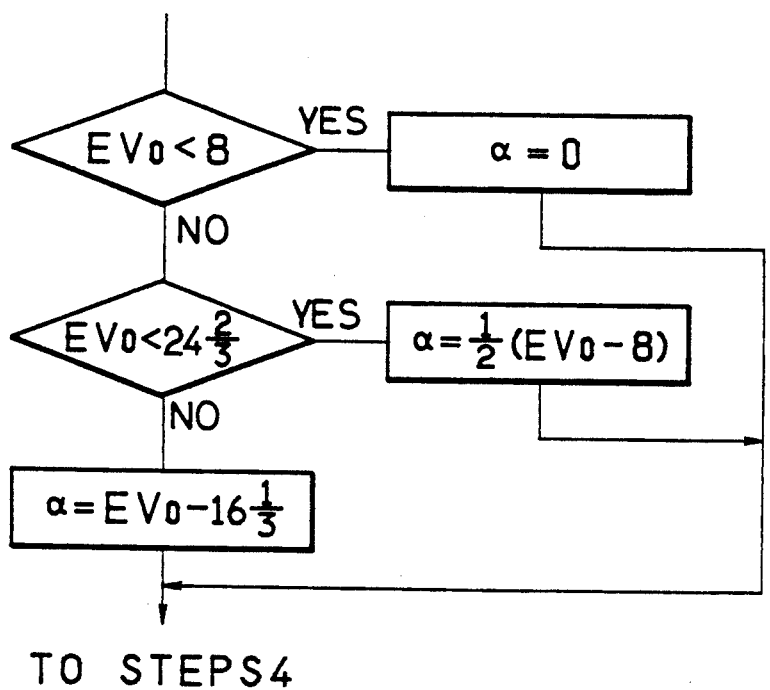

In the exposure value compensation shown in FIG. 8C, at or above a calculated exposure value EVO of $8 < EVO < 24\frac{2}{3}$, the corrected exposure value EV increases at a predetermined smaller rate than the calculated exposure value. The exposure compensation operation shown in FIG. 8C corresponds to the flowchart of FIG. 7D.

In any one of the three types of exposure value compensation shown in FIGS. 8A to 8C, when a picture is taken using the built-in flash apparatus, the calculated exposure value EVO is corrected to an exposure value which ensures overexposure.

The function of the exposure value compensation which is carried out in the manner shown in FIG. 8A when a picture is taken using the built-in flash apparatus will be described below.

The following table shows the results obtained when the exposure value compensation having the characteristics shown in FIG. 8A was performed and when no exposure value compensation was performed. In both cases, pictures were taken using an attachable flash apparatus having a large guide number and a built in flash apparatus having a small guide number.

| Compensation | Guide Number | Person | Background |
|---|---|---|---|
| Not conducted | Large | Correct Exposure | Correct Exposure |
|  | Small | Underexposure | Correct Exposure |
| Conducted | Large | Correct Exposure | Overexposure |
|  | Small | Correct Exposure | Overexposure |

In the pictures listed in the above Table, the main object was a person who was within the effective distance of the attachable flash apparatus having a large guide number but beyond the effective distance of the built-in flash apparatus having a small guide number. The pictures were taken in light which ensured a calculated exposure value of 8 or above, e.g., at dusk. Alternatively, pictures of a person who was in the shade were taken under the daylight.

When the picture was taken using the attachable flash apparatus having a large guide number without performing the exposure value compensation, correct exposure was obtained for both person and background. On the other hand, when the picture of the person who was beyond the effective distance of the built-in flash apparatus was taken using that built-in flash apparatus without performing the exposure value compensation, correct exposure was obtained for the background. However, since the amount of light of the built-in flash apparatus which illuminates the person was insufficient, underexposure was obtained for the person.

Next, in a case where the exposure value compensation was performed and the corrected exposure value EV was fixed to 8 when the calculated value EVO was 8 or above, as shown in FIG. 8A, when the picture was taken using the attachable flash apparatus having a large guide number, correct exposure was obtained for the person, while overexposure was obtained for the background because the background was illuminated by the available light as well as by the flashing.

When the picture was taken using the built-in flash apparatus having a small guide number, overexposure was obtained for the background, as in the above-described case, because the background was also illuminated by the available light. Correct exposure was obtained for the person because the exposure value was corrected to an exposure value which ensured net overexposure, and because the person was also illuminated by the available light.

Thus, in a case where a picture is taken using the attachable flash apparatus having a large guide number, no exposure value compensation according to the present invention is necessary. In a case where a picture of the person is taken using the built-in flash apparatus having a small guide number, however, correct exposure can be obtained for the person by performing the exposure compensation. Although overexposure is obtained for the background, the result is a proper photograph of the person, as intended by the operator.

FIG. 9 is a flowchart, showing another embodiment of the present invention. Even when a picture is taken using the built-in flash apparatus having a small guide number, underexposure caused by the insufficient amount of light illuminating the object can be compensated for by using a highly sensitive film. In consequence, in this embodiment, film speed is also taken into consideration in the determination as to whether or not exposure compensation is performed in the built-in flash mode.

More specifically, an exposure value EVO is calculated in step S1, as shown in FIG. 9. Thereafter, if it is determined in step S2 that a picture is taken using the built-in flash apparatus, the film speed ASA is discriminated in step S6. If it is determined in step S6 that ASA is larger than, for example, 400, no exposure value compensation is made, and the corrected exposure value EV is replaced by the calculated exposure value EVO in step S5. If it is determined in step S6 that ASA is equal to or smaller than 400, exposure compensation is performed in step S3.

FIG. 10 is a flowchart, showing another embodiment of the present invention. When a picture is taken with a small aperture value using the built-in flash apparatus having a small guide number, sufficient exposure can be obtained. In consequence, in this embodiment, aperture value is also taken into consideration in the determination as to whether or not exposure compensation is performed.

More specifically, the exposure value EVO is calculated in step S1, as shown in FIG. 10. Thereafter, if it is determined in step S2 that the picture is taken using the built-in flash apparatus, it is determined in step S7 whether or not the aperture value f is larger than, for example, 2. If it is determined that f is not greater than 2, i.e., if it is determined that the aperture value is 2 or less, the process goes to step S5 where the corrected exposure value EV is replaced by the calculated exposure value EVO, because sufficient exposure can be obtained without performing the exposure compensation.

If it is determined in step S7 that the aperture value is larger than 2, exposure compensation is performed in step S3.

Figure 11:
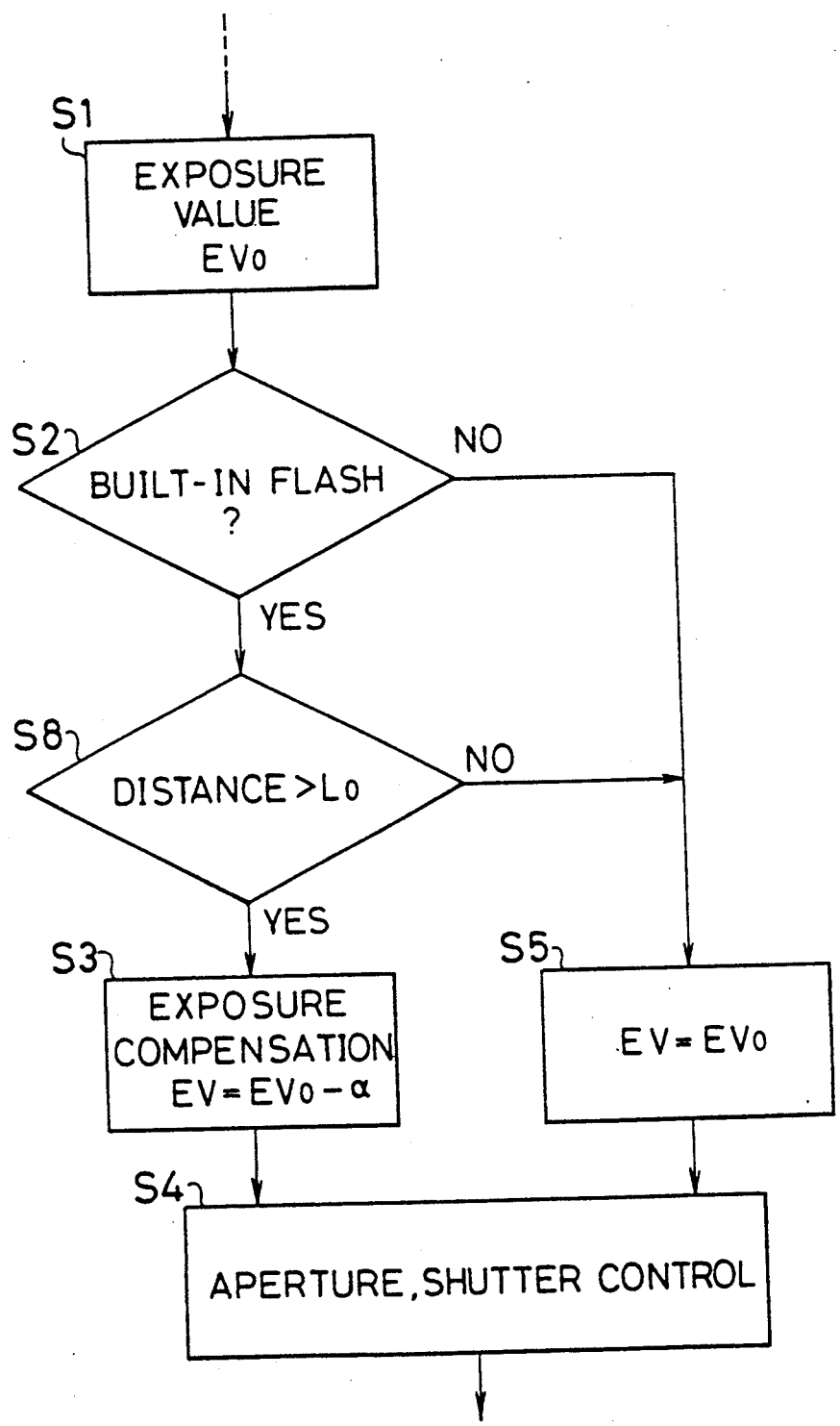

FIG. 11 is a flowchart, showing another embodiment of the present invention. In this embodiment, an object distance is also taken into consideration in the determination as to whether or not exposure compensation is performed in the built-in flash mode. More specifically, since the distance within which a picture can be taken effectively using the built-in flash apparatus is determined by the guide number thereof, if it is determined that the object is within the effective distance of the built-in flash apparatus, no exposure compensation is performed. If the object is beyond the effective distance, exposure compensation is performed.

In other words, if it is determined in step S2 that the picture is taken using the built-in flash apparatus after the exposure value EVO has been calculated in step S1, as shown in FIG. 11, the processing goes to step S8 where the object distance is compared with the effective distance L0 determined by the guide number of the built-in flash apparatus. If the object distance is not greater than the effective distance L0, no exposure compensation is performed, and the corrected exposure value is replaced by the calculated exposure value EVO in step S5, because the object can be illuminated by a sufficient amount of light coming from the object.

If it is determined in step S8 that the object is beyond the effective distance L0 of the built-in flash apparatus, exposure compensation is performed in step S3, and the aperture and the shutter speed are controlled in accordance with the corrected exposure value in step S4.

Embodiments of the present invention may also include combinations of the embodiments shown in FIGS. 9, 10 and 11.

Furthermore, the exposure value compensation according to the present invention is not limited to those shown in FIGS. 8A to 8C. In a case where the photometry circuit is of the type which employs the multi-pattern metering method, the correct red exposure value EV may be obtained on the basis of the calculated exposure value EVO using the difference in the luminance, the maximum luminance, the function of the average luminance or a combination of these values.

Moreover, when a picture is taken using the built-in flash apparatus, the aperture is obtained in accordance with the corrected exposure value, whereas the shutter speed is fixed to the largest value which avoids effects of shaking of the camera. However, in a case where the shutter speed is set to a value larger than this largest value, both the shutter speed and the aperture may be controlled on the basis of the corrected exposure value.

As was previously discussed, when the exposure compensation according to the present invention is performed, overexposure is obtained for the background. In consequence, the aperture value may be set to 2.8 or less.

In the above-described embodiments, the amount of light of the flashing is controlled by the TTL automatic illumination adjusting method. However, the external automatic illumination adjusting method may be used to control the amount of light of the flashing.

As stated above, according to the present invention, even when the amount of light coming from the flash and reflected by the object is limited because of the use of a built-in flash apparatus having a small guide number, the film can be exposed to a larger amount of available light by correcting the calculated exposure value to a value which ensures overexposure. Thus, the invention avoids underexposure of the main object such as a person, due to an insufficient amount of light illuminating the object, as would occur when the picture is taken at dusk or when the person is in the shade in the daylight.

Figure 12:
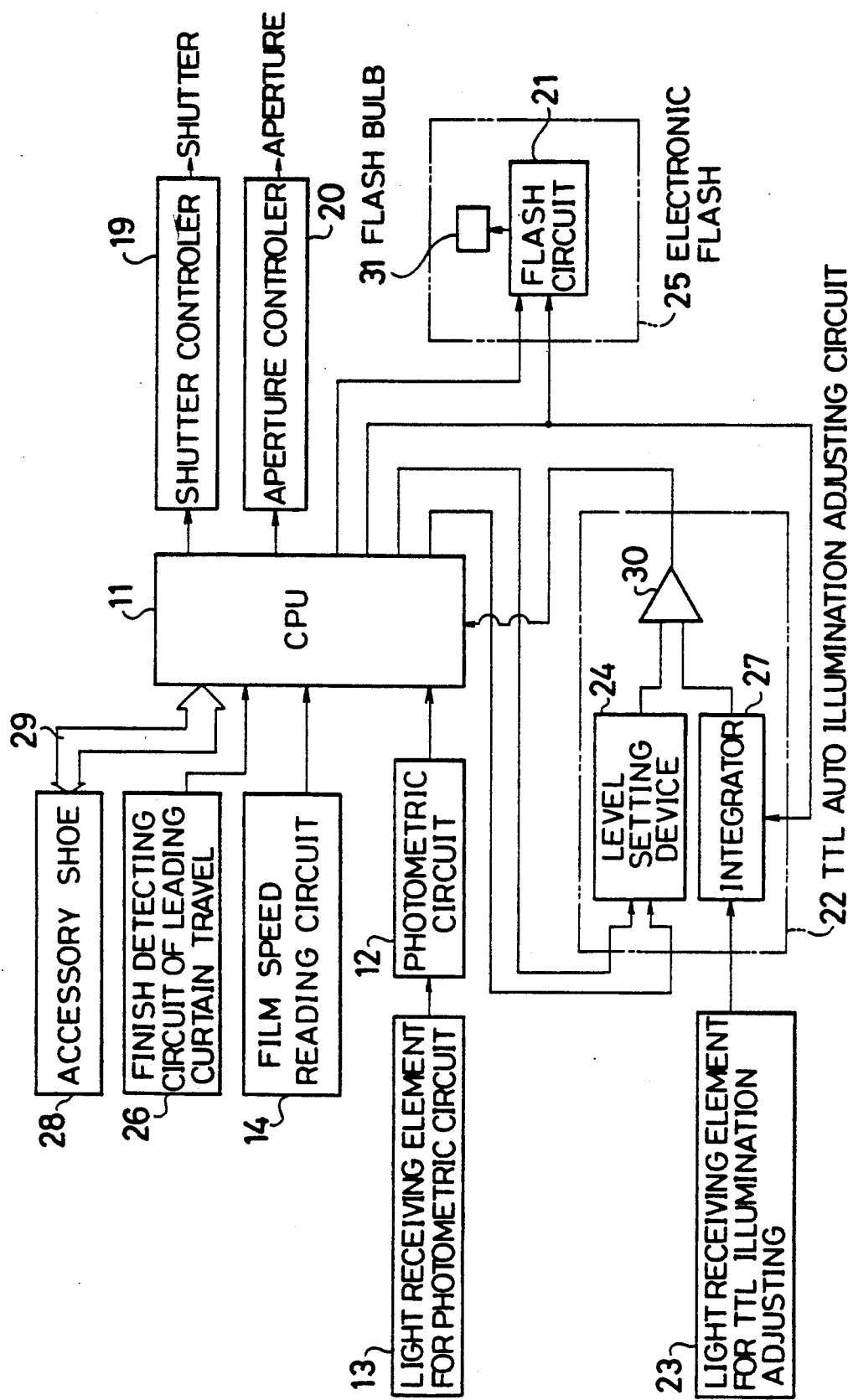
FIG. 12 is a block diagram of a control system for a TTL automatic illumination adjusting type camera.

Next, a TTL automatic illumination adjusting type camera according to the present invention will be described below with reference to FIG. 12 which is a block diagram of a control system thereof.

A light-receiving element 13 for a photometric circuit outputs a signal representing the brightness of an object to a photometric circuit 12. The photometric circuit 12 calculates the luminance of the object on the basis of the signal input, and outputs the resultant signal to a central processing unit 11. A film speed reading circuit 14 reads the film speed from a film patrone, and outputs a signal representing the film speed to the CPU 11. The CPU 11 calculates an exposure value on the basis of the luminance information from the photometric circuit 12, the film speed from the film speed reading circuit 14 and so on to obtain appropriate shutter speed and aperture value. Also, the CPU 11 controls the shutter and the aperture through a shutter controller 19 and an aperture controller 20 so that they are set to the shutter speed and the aperture value determined by the CPU 11.

The CPU 11 outputs a level setting signal to a level setting device 24 to set the illuminating adjusting level. Also, the CPU 11 recognizes the type of electronic flash apparatus 25 used as will be described below, and outputs to the level setting device 24 a level adjusting signal representing the employed electronic flash apparatus 25. The illumination adjusting level set for daylight synchronized flash is different from that set when the picture of an object having a low luminance is taken using a flash. In the former case, a standard illumination adjusting level predetermined in accordance with the luminance of the object is set, whereas, in the latter case, a predetermined illumination adjusting level is set in accordance with the film speed read in the CPU 11.

A leading curtain travel completion detecting circuit 26 detects completion of the shutter leading curtain travel, and outputs to the CPU 11 a leading curtain travel completion signal. Upon receipt of this signal, the CPU 11 sends a flash starting signal to an integrator 27 and to a flash circuit 21. An accessory shoe 28 is connected to the CPU 11 through a signal bus 29. An electronic flash apparatus mounting signal is output to the CPU 11 through the accessory shoe 28 when a non-communication type electronic flash apparatus or a communication type electronic flash apparatus, which are described later, is mounted on the shoe 28.

A TTL illumination adjusting circuit 22 (an illumination adjusting means) outputs a flash stoppage command signal when the integration value of the signal from a light-receiving element 23 for the TTL illumination adjusting circuit 22 reaches the illumination adjusting level. In order to achieve this function, the illumination adjusting circuit 22 is constructed of the level setting device (a level setting means) 24 for setting the illumination adjusting level by means of the level setting signal and the level adjusting signal from the CPU 11, the integrator 27 for integrating the signal from the light-receiving element 23 for the TTL illumination adjusting circuit 22, and a comparator 30 for comparing the integration value from the integrator 27 with the illumination adjusting level from the level setting device 24 and for outputting a flash stoppage command signal when the integration value reaches the illumination adjusting level. The operation of the integrator 27 is started by the flash starting signal which is output from the CPU 11 when the leading curtain travel has been completed. When a picture is taken in a normal way using the flash, the illumination adjusting level is set in the level setting device 24 by the level setting signal from the CPU 11. The lower the film speed, the higher the illumination adjusting level. Also, the illumination adjusting level is controlled by the level adjusting signal output from the CPU 11 in accordance with the electronic flash apparatus employed. When a picture is taken with daylight synchronized flash, the illumination adjusting level is set in accordance with the luminance of the object. Also, it is similarly controlled by the level adjusting signal.

The electronic flash apparatus 25 is of the built-in type, and includes the flash circuit 21 and a flash bulb 31. The flash bulb 31 starts flashing by a flash starting signal which is input to the flash circuit 21 from the CPU 11. Flashing of the flash bulb 31 stops by the input of a flash stopping signal from the CPU 11.

In this embodiment, two types of attachable electronic flash apparatus can be used, in addition to the electronic flash apparatus 25 that is built in a camera body. One of the attachable electronic flash apparatuses incorporates a CPU which is capable of performing communications between the flash apparatus and the camera body. The other of the attachable electronic flash apparatuses is a known type which is controlled by a flash starting signal and a flash stopping signal which are sent from the camera body. Hereinafter, the former is referred to as a communication type electronic flash apparatus, and the latter is referred to as a non-communication type electronic flash apparatus. These three types of electronic flash apparatus are discriminated by the CPU 11 in the following manner. The CPU 11 recognizes the built-in electronic flash apparatus 25 when it receives no electronic flash mounting signal from the accessory shoe 28. The non-communication type electronic flash apparatus and the communication type electronic flash apparatus are respectively distinguished by the receipt of only an electronic flash apparatus mounting signal and of both an electronic flash apparatus mounting signal and a communication signal. The CPU 11 thus constitutes a recognizing means.

Where R1, R2 and R3 are the illumination adjusting levels respectively set for the built-in electronic flash apparatus 25, the non-communication type electronic flash apparatus and the communication type electronic flash apparatus, R1, R2 and R3 have the relation indicated by $R1 < R2 < R3$, so that an object of given luminance is illuminated by the same amount of light when a picture is taken with the same exposure using any of the three types of electronic flash apparatus.

The operation procedure of the thus-arranged control system of the camera will be described below using the flowchart in FIG. 13.

Once the program shown in FIG. 13 is started by the operation of a release button, the luminance information is read in from the photometric circuit 12 to the CPU 11 in step S11. Next, in step S12, the CPU 11 determines on the basis of the luminance information whether or not a picture is taken using a flash apparatus. When an object has a predetermined luminance or less or is illuminated by rear light, the CPU 11 determines that the picture is taken using the flash apparatus, and the process goes to step S13. If it is determined that the picture is taken without using the flash apparatus, the process goes to step S14 where the picture is taken in a normal way without using the flash apparatus.

In step S13, the CPU 11 determines whether or not the picture is taken with daylight synchronized flash. If the CPU 11 determines daylight synchronized flash, the process goes to step S15. If the CPU 11 determines non-daylight synchronized flash, i.e., if the CPU 11 determines normal flashing, the process goes to step S16.

In step S16, the CPU recognizes the type of electronic flash employed. If the built-in electronic flash apparatus 25 is recognized in step S16, the illumination adjusting level R is set to R1 in step S17. If the non-communication type electronic flash is recognized in step S16, the illumination adjusting level R is set to R2 in step S18. If the communication type electronic flash is recognized in step S16, the illumination adjusting level R is set to R3 in step S19.

If the CPU 11 determines that the picture is taken with daylight synchronized flash in step S13, a standard illumination adjusting level RR is set in accordance with the luminance of the object in step S15. Next, in step S20, the CPU 11 recognizes the type of electronic flash apparatus employed in the aforementioned manner. If the built-in electronic flash apparatus 25 is recognized in step S20, the illumination adjusting level R is set to a value obtained by subtracting correction $\Delta R1$ given to the built-in electronic flash apparatus from the standard illumination adjusting level RR in step S21. If the non-communication type electronic flash apparatus is recognized in step S20, the illumination adjusting level R is set to a value obtained by deducting correction $\Delta R2$ given to the non-communication type electronic flash apparatus from the standard illumination adjusting level RR in step S22. If the communication type electronic flash apparatus is recognized in step S20, the illumination adjusting level R is set to a value obtained by deducting correction ΔR3 given to the communication type electronic flash apparatus from the standard illumination adjusting level RR in step S23. These corrections ΔR1, ΔR2 and ΔR3 have a relationship of ΔR1>ΔR2>ΔR3.

Once the illumination adjusting level R has been set in the manner described above, it is determined in step S24 whether or not the release button is fully operated by means of a signal from a full pressing switch (not shown). If the answer is negative, it is determined in step S25 whether or not the half pressing operation has been performed by means of a signal from the half pressing switch (not shown). If the answer is affirmative, the process returns to step S11. If the answer is negative, the process proceeds to the end.

If it is determined in step S24 that the release button has been fully calculated, travel of the leading curtain of a shutter starts in step S26. Thereafter, it is determined in step S27 whether or not travel of the leading curtain is completed by the presence or absence of a leading curtain travel completion signal. If the answer is negative, the affirmation of the process of step S27 is awaited. If the answer is affirmative, the process goes to step S28 where a flash starting signal is output to the integrator 27 and, for example, the electronic flash apparatus 25 built in the camera body, by means of which the flash circuit 21 causes the flash bulb 31 to flash and the integrator 27 starts integration. Once the integration value of the integrator 27 reaches the preset illumination adjusting level R, the comparator 30 outputs a flash stoppage command signal to the CPU 11. Upon receipt of this signal, the CPU 11 sends a flash stopping signal to the flash circuit 21 to stop flashing of the flash bulb 31 in step S30.

As stated above, in this embodiment, when a picture is taken using any of three types of electronic flash apparatus, the electronic flash employed is recognized, and the illumination adjusting level is adjusted in accordance with the flashing characteristics of the electronic flash apparatus which is employed. In consequence, an object having a given luminance can be illuminated by the same amount of light, and an optimal exposure can be obtained when a picture is taken using any of the above-described electronic flash apparatuses.

The present invention is characterized in that the illumination adjusting level is set in accordance with the electronic flash apparatus employed. It is therefore possible to employ other types of electronic flash apparatus which are not described alone. Furthermore, the electronic flash apparatus recognizing method is not limited to that described above. For example, recognition signal may be manually input by an operator in accordance with the type of electronic flash apparatus employed.

In the present invention, since the illumination adjusting level is set in accordance with the electronic flash apparatus employed, a correct exposure can be obtained when a picture is taken using a TTL automatic illumination adjusting type camera with any of various types of electronic flash apparatus having different flashing characteristics.

What is claimed is:

1. A camera of the type in which illumination adjustment can be automatically controlled when a picture is taken using either of a first flash apparatus and a second flash apparatus, comprising:

exposure value calculating means for calculating an exposure value on the basis of photometering of an object before an exposure operation is started and for outputting the calculated exposure value;

exposure value compensating means for automatically determining whether to adjust the calculated exposure value to a compensated exposure value which assures overexposure, and for outputting the calculated exposure value or automatically adjusting the calculated exposure value to the compensated exposure value and outputting the compensated exposure value, in accordance with said determination; and exposure control means for performing an exposure operation in accordance with the exposure value which is output from said exposure value calculating means when a picture is taken using said first flash apparatus and in accordance with the exposure value which is output from said exposure value compensating means when a picture is taken using said second flash apparatus.

2. A camera according to claim 1, wherein said first flash apparatus is an attachable flash apparatus, and said second flash apparatus is a flash apparatus built in a camera body of the camera.

3. A camera according to claim 1, wherein said first flash apparatus incorporates flashing means having a guide number which is larger than a predetermined value, and said second flash apparatus incorporates a flashing means having a guide number which is less than said predetermined value.

4. A camera according to claim 1, wherein said exposure value compensating means does not adjust the calculated exposure value when a film speed detecting means of the camera detects that the film speed is faster than a predetermined value, when an aperture value detecting means of the camera detects that an aperture value is less than a predetermined value and/or when an object distance detecting means of the camera detects that an object distance is within the effective distance of the second flash apparatus.

5. A camera according to claim 1, wherein said exposure value compensating means does not adjust the calculated exposure value when the calculated exposure value is less than a predetermined value.

6. A camera according to claim 1, wherein said exposure value compensating means adjusts the calculated exposure value to a fixed value when the calculated exposure value is equal to or larger than a predetermined value.

7. A camera according to claim 1, wherein said exposure value compensating means adjusts the calculated exposure value to a value obtained by deducting a fixed value from the calculated exposure value when the calculated exposure value is equal to or larger than a predetermined value.

8. A camera according to claim 1, wherein for a range of calculated exposure values equal to or larger than a predetermined value said exposure value compensating means adjusts the calculated exposure value such that the rate of increase in compensated exposure value is at a predetermined smaller rate than the rate of increase of calculated exposure value.

9. A camera according to claim 2, wherein a determination as to whether or not said second flash apparatus is used is made depending upon popping up of said second flash apparatus.

10. A camera capable of selectively using different types of flash apparatus having distinct flashing characteristics, comprising:
illumination adjusting means for receiving light from an object to be photographed and for stopping the flashing of at least one said type of flash apparatus when the amount of light received reaches a set level;
recognizing means for recognizing the type of flash apparatus selected and for outputting a recognition signal; and
level adjusting means responsive to said recognition signal for setting said level such that an object of given luminance will be illuminated by the same amount of flash light regardless of which said type of flash apparatus is used.

11. A camera according to claim 10, wherein said recognizing means discriminates between types of flash apparatus having different flashing waveforms and/or flash stopping capabilities and outputs said recognition signal accordingly.

12. An automatic illumination adjusting type camera in which either of a first flash apparatus and a second flash apparatus may be selected when a picture is taken using flash, and the flashing of the selected flash apparatus is stopped when an amount of light received from an object reaches a set level and, comprising:
exposure value calculating means for calculating an exposure value on the basis of photometering of an object before an exposure operation is started and for outputting the calculated exposure value;
exposure value compensating means for automatically determining whether to adjust the calculated exposure value to a compensated exposure value which assures overexposure, and for outputting the calculated exposure value or automatically adjusting the calculated exposure value to the compensated exposure value and outputting the compensated exposure value, in accordance with said determination; and
exposure control means for performing an exposure operation in accordance with the exposure value which is output from said exposure value calculating means and setting said level to a first predetermined value when said first flash apparatus is used to take a picture, and for performing an exposure operation in accordance with the exposure value which is output from said exposure value compensating means and setting said level to a second predetermined value when said second flash apparatus is used to take a picture.

13. An automatic illumination adjusting type camera according to claim 12, wherein said first flash apparatus is an attachable flash apparatus, and said second flash apparatus is a flash apparatus built in a camera body of the camera.

14. A camera of the type which is capable of operating first and second flash apparatuses selectively, comprising:
means for receiving light from an object and for outputting a flash stopping signal when an integration value of the light received reaches a set level; and
setting means for automatically setting said level to different predetermined values according to the flash apparatus selected.

15. A camera in which flashing of a flash apparatus built in said camera is automatically stopped, comprising:
light measuring means for outputting a light measuring output in response to light from an object to be photographed;
calculating means for calculating an exposure value on the basis of said light measuring output;
compensating means for automatically determining whether to adjust the calculated exposure value to a compensated exposure value when a picture is taken using said built-in flash apparatus and adapted automatically to adjust the calculated exposure value to the compensated exposure value or not to adjust the calculated exposure value, in accordance with said determination; and
exposure control means for controlling an exposure operation in accordance with the calculated exposure value and the compensated exposure value, selectively.

16. A camera according to claim 15, wherein the compensated exposure value is smaller than the calculated exposure value.

17. A camera according to claim 15, wherein said compensating means comprises means for determining a correction value and decreasing means for decreasing the calculated exposure value by said correction value.

18. A camera according to claim 17, wherein said correction value determining means determines said correction value on the basis of the calculated exposure value.

19. A camera according to claim 18, wherein said correction value determining means sets said correction value to zero when the calculated exposure value is larger than a predetermined exposure value.

20. A camera according to claim 17, further comprising means for detecting that an aperture value of a photographing lens is smaller than a predetermined value and for generating a corresponding detection signal, and wherein said correction value determining means sets said correction value to zero in response to said detection signal.

21. A camera according to claim 17, further comprising means for detecting that an object distance is smaller than a predetermined distance and for generating a corresponding detection signal, and wherein said correction value determining means sets said correction value to zero in response to said detection signal.

22. A camera according to claim 17, further comprising means for detecting that a film speed is faster than a predetermined speed and for generating a corresponding detection signal, and wherein said correction value determining means sets said correction value to zero in response to said detection signal.

* * * * *